US010938742B1

(12) United States Patent
Kurian et al.

(10) Patent No.: US 10,938,742 B1
(45) Date of Patent: Mar. 2, 2021

(54) MULTIPLEXED RESOURCE ALLOCATION ARCHITECTURE

(71) Applicant: Bank of America Corporation, Charlotte, NC (US)

(72) Inventors: Manu J. Kurian, Dallas, TX (US); Sasidhar Purushothaman, Hyderabad (IN); Rajesh Narayanan, Chennai (IN)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 16/779,166

(22) Filed: Jan. 31, 2020

(51) Int. Cl.
*H04L 12/911* (2013.01)
*H04L 12/26* (2006.01)
*H04L 12/815* (2013.01)
*H04L 12/851* (2013.01)
*H04L 12/919* (2013.01)

(52) U.S. Cl.
CPC .......... *H04L 47/827* (2013.01); *H04L 43/026* (2013.01); *H04L 47/22* (2013.01); *H04L 47/2441* (2013.01); *H04L 47/2483* (2013.01); *H04L 47/765* (2013.01); *H04L 47/788* (2013.01)

(58) Field of Classification Search
CPC ..... H04L 47/827; H04L 43/026; H04L 47/22; H04L 47/2441; H04L 47/765; H04L 47/2483; H04L 47/788
See application file for complete search history.

(56) References Cited

U.S. PATENT DOCUMENTS

| 5,889,956 A | 3/1999 | Hauser et al. |
| 6,260,068 B1 | 7/2001 | Zalewski et al. |
| 6,438,537 B1 | 8/2002 | Netz et al. |
| 6,466,559 B1 | 10/2002 | Johansson et al. |

(Continued)

FOREIGN PATENT DOCUMENTS

| EP | 2176751 B1 | 10/2014 |
| EP | 2056515 B1 | 6/2019 |

(Continued)

OTHER PUBLICATIONS

Abdullah, "Segment Routing in Software Defined Networks: A Survey", IEEE Communications Surveys & Tutorials, vol. 21, No. 1, First Quarter 2019, p. 464-486, total 22 pages, (Year: 2019).*

*Primary Examiner* — Arvin Eskandarnia
*Assistant Examiner* — Chhian (Amy) Ling
(74) *Attorney, Agent, or Firm* — Michael A. Springs

(57) ABSTRACT

A device configured to receive a data set and instructions for processing the data set from a network device. The device is further configured to identify data flow paths within the instructions and to parse the data set into data segments that correspond with the identified data flow paths. The device is further configured to generate an instruction segment for each data flow path by associating each data segment with a corresponding subset of commands for each data flow path, to assign each instruction segment to a resource unit, and to generate control information with instructions for combining processed data segments from the resource units. The device is further configured to receive processed data segments from the resource units, to generate the processed data set by combining the received processed data segments, and to output the processed data set to the network device.

20 Claims, 4 Drawing Sheets

(56) References Cited

U.S. PATENT DOCUMENTS

| | | | |
|---|---|---|---|
| 6,675,278 B1 | 1/2004 | Chowdhary et al. | |
| 6,728,895 B1 | 4/2004 | Nelson | |
| 6,766,348 B1 | 7/2004 | Combs et al. | |
| 6,801,224 B1 | 10/2004 | Lewallen | |
| 6,854,123 B1 | 2/2005 | Lewallen | |
| 6,865,393 B1 | 3/2005 | Baum et al. | |
| 7,225,223 B1 | 3/2007 | McCarthy et al. | |
| 7,516,453 B1 | 4/2009 | Bugnion | |
| 7,530,068 B2 | 5/2009 | Clark et al. | |
| 7,558,859 B2 | 7/2009 | Kasiolas et al. | |
| 7,657,881 B2 | 2/2010 | Nagendra et al. | |
| 7,673,293 B2 | 3/2010 | Sanyal | |
| 7,707,578 B1 | 4/2010 | Zedlewski et al. | |
| 7,711,821 B2 | 5/2010 | Pendarakis et al. | |
| 7,721,292 B2 | 5/2010 | Frasier et al. | |
| 7,761,238 B2 | 7/2010 | Moser et al. | |
| 7,765,552 B2 | 7/2010 | Miller et al. | |
| 7,788,671 B2 | 8/2010 | Black-Ziegelbein et al. | |
| 8,245,230 B2 | 8/2012 | Danko | |
| 8,296,551 B2 | 10/2012 | Bugnion | |
| 8,307,362 B1 | 11/2012 | Gong et al. | |
| 8,327,439 B2 | 12/2012 | Spurlock et al. | |
| 8,387,052 B2 | 2/2013 | Dodge et al. | |
| 8,429,276 B1 | 4/2013 | Kumar et al. | |
| 8,495,646 B2 | 7/2013 | Uchida | |
| 8,516,508 B1 | 8/2013 | Tran | |
| 8,589,920 B2 | 11/2013 | Tene et al. | |
| 8,706,798 B1 | 4/2014 | Suchter et al. | |
| 8,813,089 B2 | 8/2014 | Baruch et al. | |
| 8,762,999 B2 | 9/2014 | Johnson et al. | |
| 8,825,858 B1 | 9/2014 | Atchity et al. | |
| 8,843,945 B2 | 9/2014 | Tran | |
| 8,874,610 B2 | 10/2014 | Geroulo | |
| 8,898,402 B1 | 11/2014 | Stronge | |
| 8,910,137 B2 | 12/2014 | Agarwal et al. | |
| 8,943,011 B2 | 1/2015 | Gong et al. | |
| 9,008,807 B2 | 4/2015 | Shapiro et al. | |
| 9,009,156 B1 | 4/2015 | Jiang et al. | |
| 9,081,618 B2 | 7/2015 | Kiehn | |
| 9,122,398 B2 | 9/2015 | Gupta et al. | |
| 9,164,802 B2 | 10/2015 | Netto | |
| 9,336,147 B2 | 5/2016 | Kotla et al. | |
| 9,348,391 B1 | 5/2016 | Marr et al. | |
| 9,363,197 B2 | 6/2016 | Waldspurger | |
| 9,442,763 B2 | 9/2016 | Chai | |
| 9,497,136 B1 | 11/2016 | Ramarao et al. | |
| 9,628,362 B2 | 4/2017 | Vasseur et al. | |
| 9,716,608 B2 | 7/2017 | Duan et al. | |
| 9,722,866 B1 | 8/2017 | Brooker et al. | |
| 9,778,924 B2 | 10/2017 | Batabyal et al. | |
| 9,798,522 B2 | 10/2017 | Strachota et al. | |
| 9,910,646 B2 | 3/2018 | Kanhere et al. | |
| 10,120,724 B2 | 11/2018 | Badjatia et al. | |
| 10,176,435 B1 | 1/2019 | Sarkar et al. | |
| 10,210,470 B2 | 2/2019 | Datta Ray | |
| 2003/0236869 A1* | 12/2003 | Emmot | H04L 47/34 709/223 |
| 2005/0132362 A1 | 6/2005 | Knauerhase et al. | |
| 2006/0184938 A1 | 8/2006 | Mangold | |
| 2007/0266388 A1 | 11/2007 | Jackson | |
| 2015/0071109 A1* | 3/2015 | Dzekon | H04L 45/72 370/254 |
| 2018/0167317 A1* | 6/2018 | Hoyne | H04L 45/22 |
| 2018/0255122 A1* | 9/2018 | Hu | G06F 9/445 |
| 2018/0359059 A1* | 12/2018 | Kurian | H04L 63/1483 |
| 2019/0104075 A1* | 4/2019 | Li | H04L 49/3009 |
| 2019/0129887 A1* | 5/2019 | Bowman | H05K 999/99 |

FOREIGN PATENT DOCUMENTS

| | | |
|---|---|---|
| GB | 2506195 A | 3/2014 |
| GB | 2474666 B | 7/2015 |

* cited by examiner

MULTIPLEXED RESOURCE ALLOCATION ARCHITECTURE

TECHNICAL FIELD

The present disclosure relates generally to processing architectures, and more specifically to a multiplexed resource allocation architecture.

BACKGROUND

Existing computer systems lack the framework for handling and processing complex data sets. A complex data set may include a large volume of data that needs to be computed using a variety of commands. Typically, a computer system uses a single computing device to process complex data sets in order to maintain the integrity of the data. This approach is hardware intensive and consumes a significant amount of memory and processing resources of the computing device. These computing devices are also limited by the type and the amount of hardware resources that are installed on the computing device. For example, the throughput of the computing device is limited by the hardware that is currently installed on the device. Scaling and reconfiguring these computing devices for processing complex data sets poses technical challenges as data sets become larger and more complex. For example, these computing devices may lack the physical space, power capabilities, and/or cooling capabilities to include additional hardware resources that may be necessary for processing more complex data sets. This means that existing computer systems are limited in their ability to process complex data sets.

SUMMARY

The system disclosed in the present application provides a technical solution to the technical problems discussed above by providing the capability to parse complex data sets and instructions into smaller components that can be allocated and distributed among a plurality of devices for processing. The disclosed system provides several practical applications and technical advantages which include a process for dividing a complex data set and instructions into smaller components which can then be processed independently and later recombined to generate a complete processed data set. The processed data set provides a similar result as if the data set were processed by a single computing device. This approach provides better resource utilization and a higher throughput compared to existing approaches that rely on a single computing device for processing data. By dividing and distributing the data set among multiple devices, the amount of resources required for each device to compute a portion of the data set is reduced. In addition, the disclosed system provides a process for allocating the portions of the data set to other devices and collecting the individual results from each of these devices to generate the processed data set. For example, this process allows the portions of the data set to be scheduled and allocated to different devices based on the specific requirements for each portion of the data set.

In one embodiment, the disclosed system includes a device that is configured to receive a data set and instructions for processing the data set from a network device. The device is configured to identify data flow paths within the instructions and to parse the data set into data segments that correspond with the identified data flow paths. Each data flow path describes a portion of the instructions and identifies the commands and data that are associated with each portion of the instructions. The device is further configured to generate instruction segments for each data flow path by associating each data segment with a corresponding subset of commands from the instructions for each data flow path. By identifying data flow paths within the instructions, the device is able to break down the data set and the instructions into smaller sections (i.e. instruction segments) that can be processed by different devices.

The device is further configured to assign each instruction segment to a resource unit that comprises hardware and software resources for processing data. These resource units may include a combination of other network devices within a local network, other network devices outside of a local network, and computing resources that are installed on the device itself. After assigning the instruction segments to resource units, the device is configured to generate control information with instructions for combining processed data segments from each of the resource units to generate a processed data set. Once the instruction segments have been processed by their respective resource unit, the device is configured to receive the processed data segments from the resource units. The device is then configured to generate the processed data set by combining the received processed data segments in accordance with the control information. After generating the processed data set, the device is further configured to output the processed data set back to the network device that provided the data set and instructions. Through this process the device is able to improve the operation of an underlying computer system by providing better resource utilization, providing a higher throughput, and reducing the burden on any particular computing device.

Certain embodiments of the present disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Resource Allocation System Overview

Figure 1:
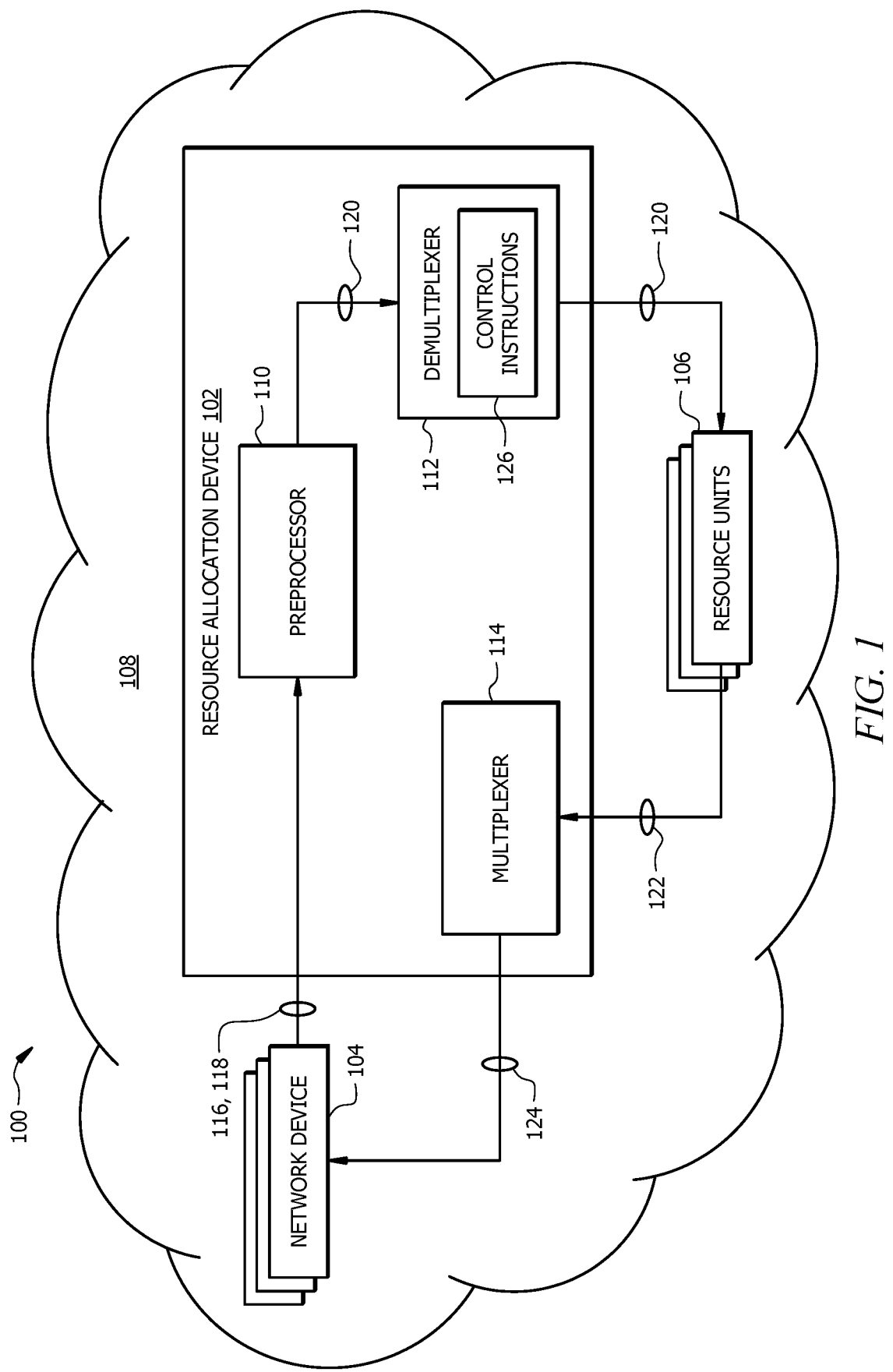
FIG. 1 is a schematic diagram of a resource allocating system configured to allocate and manage hardware and software resources.

FIG. 1 is a schematic diagram of resource allocating system 100 that is configured to allocate and manage hardware and software resources. More specifically, the resource allocation system 100 is configured to process data by parsing the data with its processing instructions into sub-segments that can be allocated and distributed among a plurality of devices for processing. The resource allocation system 100 is further configured to collect the individual processed data segments and to recombine them to generate a processed data set. The processed data set is a similar result as if the data were processed by a single device. This process provides better resource utilization and a higher throughput by using parallel processing compared to existing approaches which rely on using a single device for processing data.

In one embodiment, the resource allocation system 100 comprises a resource allocation device 102 that is in signal communication with one or more network devices 104 and resource units 106 in a network 108. The resource allocation system 100 may be configured as shown or in any other suitable configuration.

The network 108 may be any suitable type of wireless and/or wired network including, but not limited to, all or a portion of the Internet, an Intranet, a private network, a public network, a peer-to-peer network, the public switched telephone network, a cellular network, a local area network (LAN), a metropolitan area network (MAN), a wide area network (WAN), and a satellite network. The network 108 may be configured to support any suitable type of communication protocol as would be appreciated by one of ordinary skill in the art.

Network Devices

Examples of network devices 104 include, but are not limited to, computers, laptops, mobile devices (e.g. smart phones or tablets), servers, clients, or any other suitable type of device. The network device 104 is generally configured to send data 116 and instructions 118 for processing the data 116 to the resource allocation device 102. For example, the data 116 may comprise network traffic information and the instructions 118 may comprise a plurality of commands 302 (illustrated further in FIG. 3) for processing the network traffic information to determine whether a network attack has occurred. As another example, the data 116 may comprise network performance information and the instructions 118 may comprise a plurality of commands 302 for processing the network performance information to determine a network performance level. In other examples, the data 116 may comprise any suitable type of data. The instructions 118 may comprise any suitable type or number of commands 302 for processing the data 116. The network device 104 is further configured to receive a processed data set 124 from the resource allocation device 102 in response to sending the data 116 and the instructions 118 for processing the data 116 to the resource allocation device 102.

Resource Units

A resource unit 106 is a device that can be temporarily utilized for processing data 116. Each resource unit 106 comprises a combination of hardware resource and/or software resources for processing data 116. Examples of hardware resources include, but are not limited to, hardware processors, memory, networking resources, and any other suitable type of hardware. Examples of software resources include, but are not limited to, algorithms, data models, applications, virtual machines, and any other suitable type of software resources.

A resource unit 106 can be a device either within the network 108 or a device that is external from the network 108. For example, a resource unit 106 may be another network device within the network 108. As another example, a resource unit 106 may be a remote network device in a different network, for example a cloud device or server. In these examples, the resource unit 106 is a device that comprises hardware resources (e.g. one or more processors and a memory) and/or software resources (e.g. applications or functions) that can be allocated for processing data 116.

In some examples, a resource unit 106 may comprise a portion of the hardware and/or software within the resource allocation device 102. For instance, the resource allocation device 102 may be configured to allocate a portion of its hardware and/or software resources for processing data 116. The resource allocation system 100 may comprise any suitable type and/or number of resource units 106.

Resource Allocation Device

In one embodiment, the resource allocation device 102 comprises a preprocessor 110, a demultiplexer 112, and a multiplexer 114. The preprocessor 110, the demultiplexer 112, and the multiplexer 114 are implemented by a resource allocation engine 408 as described in FIG. 4. Additional information about the operation of the resource allocation device 102 using the preprocessor 110, the demultiplexer 112, and the multiplexer 114 is described in FIG. 2.

Preprocessor

The preprocessor 110 is configured to receive data 116 and instructions 118 for processing the data 116 from a network device 104 and to parse the data 116 and instructions 118 into instruction segments 120. Each instruction segment 120 comprises a portion of the data 116 and a subset of the commands 302 from the instructions 118 for processing the data 116. Existing systems are typically configured to use a single device to process data 116 and instructions 118. In contrast, the preprocessor 110 parses the data 116 and the instructions 118 into smaller segments which allows them to be distributed among a plurality of resource units 106 for processing. The preprocessors 110 sends the instruction segments 120 to the demultiplexer 112 so that they can be allocated to different resource units 106. This process provides improved efficiency and performance. For example, the preprocessor 110 enables parallel processing by distributing the data 116 and instructions 118 among multiple resource units 106 which reduces the amount of time required to process the data 116 because they can be executed in parallel (i.e. at the same time). In addition, the preprocessor 110 may parse the data 116 and instructions 118 into segments that allows each segment to be processed more efficiently individually using a combination of hardware and software resources that are best suited for processing the data 116 and instruction 118 segment. This provides additional performance improvements.

Demultiplexer

The demultiplexer 112 is configured to receive instruction segments 120 from the preprocessor 110 and to assign each instruction segment 120 to a resource unit 106. For example, the demultiplexer 112 may assign instruction segments 120 based on the availability of a resource unit 106. As another example, the demultiplexer 112 may determine processing requirements for an instruction segment 120 and may then assign the instruction segment 120 to a resource unit 106 that is able to satisfy the processing requirements of the instruction segment 120. Examples of processing requirements include, but are not limited to, a minimum or maximum number of hardware resources, required hardware resources, required software resources, a throughput speed, an amount of available memory, a response time, a latency time, packet size limitations, bandwidth limitations, or any other suitable type of processing requirement. In other examples, the demultiplexer 112 may allocate the instruction segments 120 to resource units 106 using any other suitable technique.

The demultiplexer 112 is further configured to generate control information 126 for the instruction segments 120. The control information 126 comprises reconstruction information for recombining the data received from the resource units 106 to generate a complete processed data set 124. A processed data set 124 is a similar result as if the data 116 and instructions 118 had been processed entirely by a single device. The demultiplexer 112 may distribute and allocate instruction segments 120 in any order. This means that the instruction segments 120 may not be processed by the resource units 106 in any particular order. This poses a technical challenge for recombining the processed data segments 122 from the various resource units 106. To address this issue, the demultiplexer 112 generates control information 126 that comprises information about the relationship between different instruction segments 120 which allows the processed data segments 122 from the resource units 106 to be recombined in the appropriate order to generate a processed data set 124. For example, the control information 126 may identify an order for arranging processed data segments 122 to generate the processed data set 124.

The demultiplexer 112 is further configured to reallocate some instruction segments 120 to the same resource unit 106 to provide additional performance improvements. For example, the demultiplexer 112 may be configured to monitor the number of interactions (e.g. function calls or data transfers) between two resource units 106. In this example, the demultiplexer 112 may be configured to count the number of times that the resource units 106 communicate with each other to determine whether additional performance improvements can be achieved by consolidating the instruction segments 120 from each resource unit 106 into a single resource unit 106. Consolidating the instruction segments 120 into a single resource unit 106 may reduce the amount of latency or delay that is caused by sending information between the different resource units 106 which allows the instruction segments 120 to be processed faster and provides a higher throughput.

Multiplexer

The multiplexer 114 is configured to receive processed data segments 122 from the resource units 106 that are assigned instruction segments 120. For example, each resource unit 106 may be configured to receive an instruction segment 120 and to send a processed data segment 122 to the multiplexer 114 in response to processing a portion of the data 116 that is associated with the instruction segment 120. The multiplexer 114 is configured to combine the received data segments 122 in accordance with the reconstruction instructions in the control information 126 to generate a processed data set 124. The multiplexer 114 is further configured to output the processed data set 124 back to the network device 104 that originally provided the data 116 and the instructions 118.

Through this process, the resource allocation device 102 employs the preprocessor 110, the demultiplexer 112, and the multiplexer 114 to improve the operation of the system by parsing data 116 and instructions 118 into segments that allows the data 116 and instructions 118 to be allocated and distributed among multiple resource units 106 to generate a processed data set 124. This process provides better resource utilization and a higher throughput compared to existing approaches which rely on using a single device for processing data.

Resource Clustering Process

Figure 2:
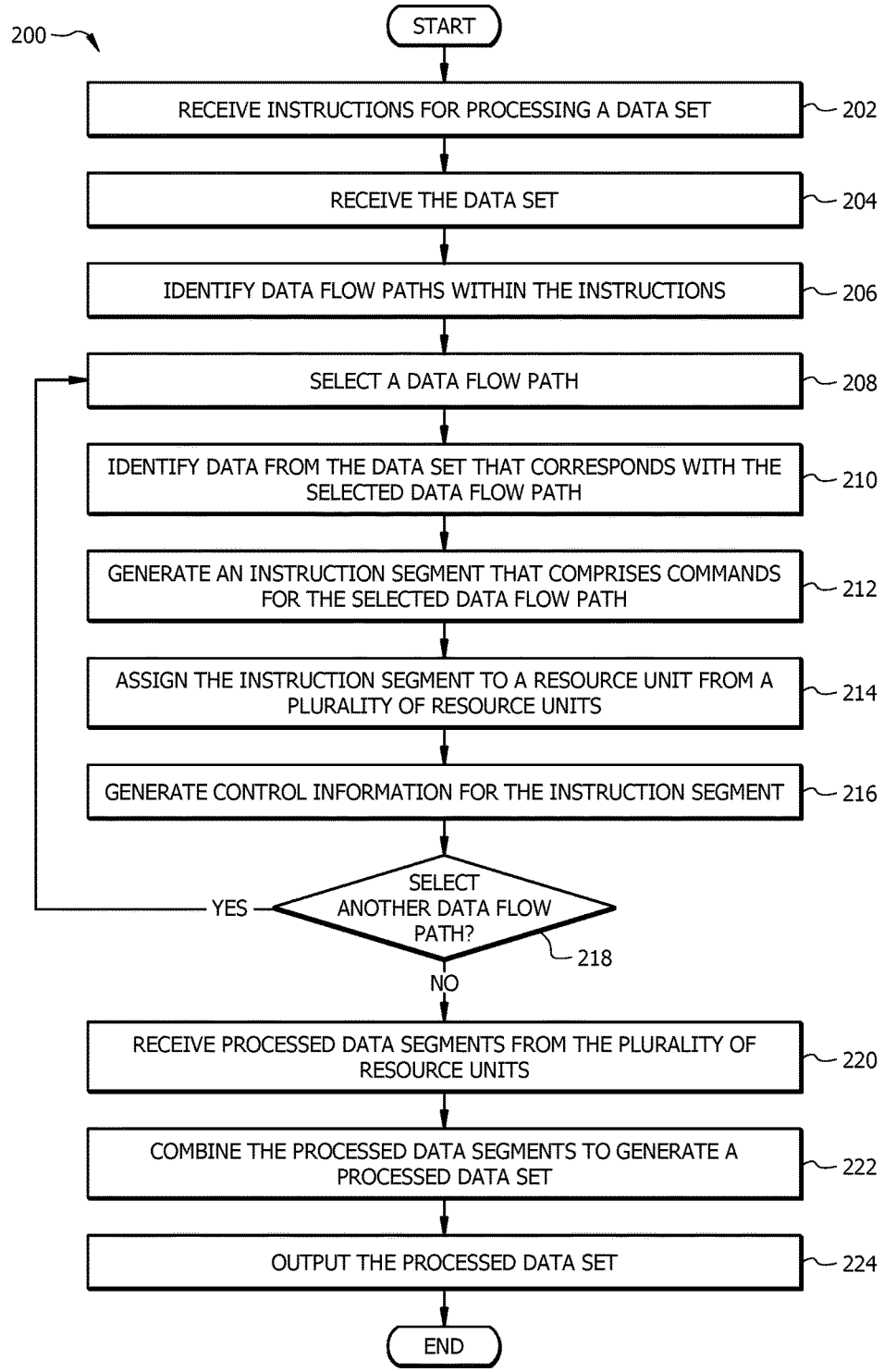
FIG. 2 is a flowchart of an embodiment of a resource allocating method.

FIG. 2 is a flowchart of an embodiment of a resource allocating method 200. The resource allocation device 102 may employ method 200 to parse data 116 and instructions 118 so that they can be allocate and distributed among a plurality of resource units 106 for processing data 116.

Figure 3:
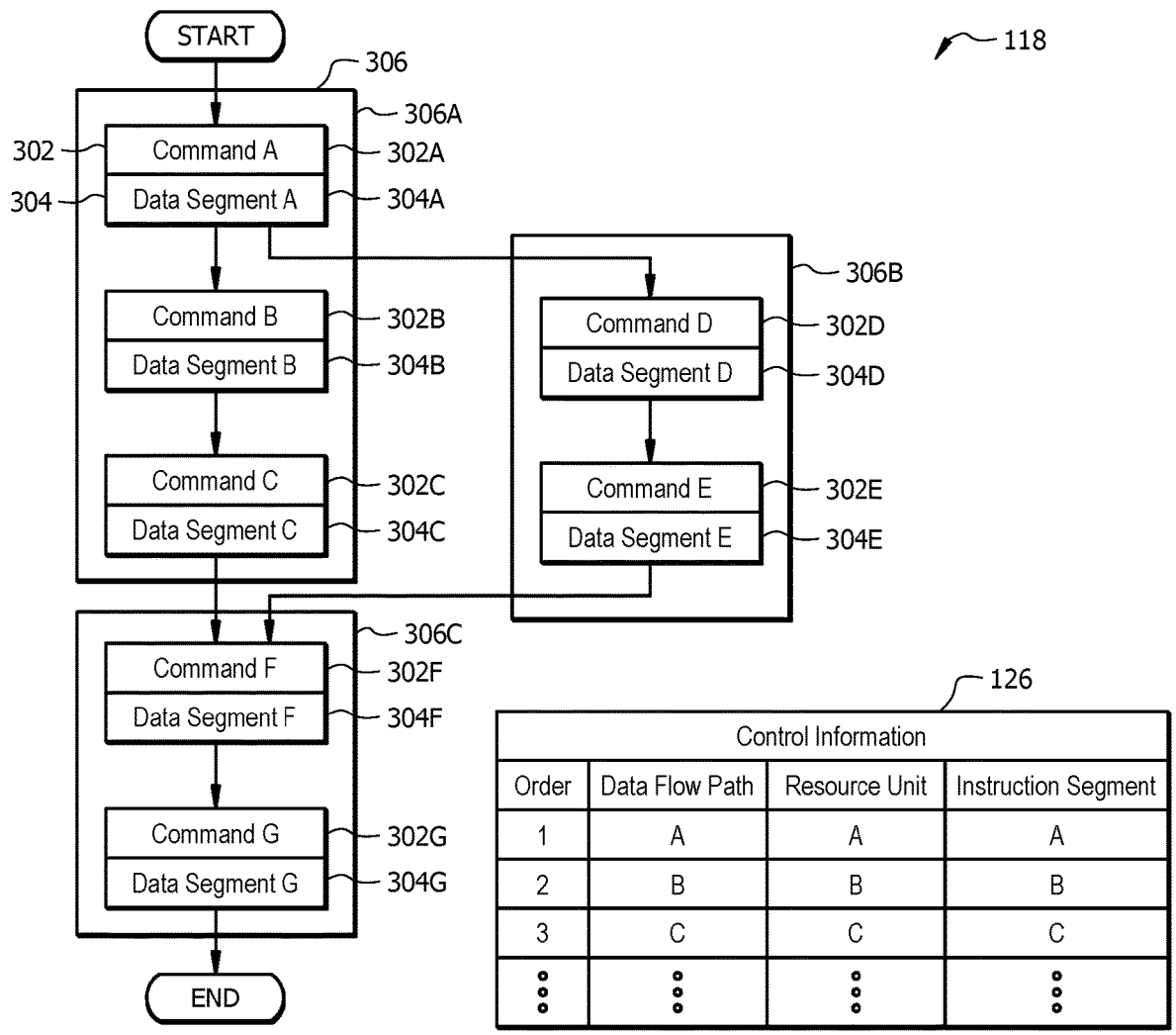
FIG. 3 is an example of instructions for processing a data set.

At step 202, the resource allocation device 102 receives instructions 118 for processing a data set 116. The instructions 118 comprise a plurality of commands 302 for processing data 116. Examples of commands 302 include, but are not limited to, loops (e.g. for loops and while loops), function calls, data transfers, arithmetic operations (e.g. addition, subtraction, multiplication, and division), Boolean logical operations (e.g. AND, OR, and XOR operations), encryption operations (e.g. hashing operations), and any other suitable type of command. For example, FIG. 3 shows an example of instructions 118 for processing a data set 116. In FIG. 3, the instructions 118 comprise a plurality of commands 302 (shown as commands 302A, 302B, 302C, 302D, 302E, 302F, and 302G). Each command 302 may be associated with a portion of the data 116 (shown as data segment 304A, 304B, 304C, 304D, 304E, 304F, and 304G) that it is executed with. In other words, each command 302 is configured to perform operations on one or more portions of the data 116 that are associated with the command 302 in the instructions 118.

Returning to FIG. 2 at step 204, the resource allocation device 102 receives the data set 116 that is associated with the instructions 118. In one example, the resource allocation device 102 receives the data 116 from the network device 104 with the instructions 118 for processing the data 116. In another example, the resource allocation device 102 may receive information from the network device 104 that identifies a location where the data 116 can be obtained from by the resource allocation device 102. For example, the resource allocation device 102 may receive an address that identifies a location in memory where the data 116 is stored. As another example, the resource allocation device 102 may receive a device identifier (e.g. an IP address and/or a MAC address) that identifies a device (e.g. a memory or database) that is storing the data 116. In this case, the resource allocation device 102 may access the identified location where the data 116 is stored to obtain the data 116.

Once the resource allocation device 102 obtains the data 116 and instructions 118 for processing the data 116, the resource allocation device 102 parses the obtained information into smaller portions (i.e. instruction segments 120) by identifying data flow paths 306 within the instructions 118. At step 206, the resource allocation device 102 identifies data flow paths 306 within the instructions 118. A data flow path 306 is an ordered sequence of commands 302 for manipulating at least a portion of the data 116. A data flow path 306 may comprise a series of commands 302 for performing a mathematical operation on a data set 116, encrypting a data set 116, formatting a data set 116, or performing any other suitable type of operation on a data set 116. In one embodiment, a data flow path 306 is self-contained and can be executed without relying on data 116 from other data flow paths 306. In other embodiments, data flow paths 306 may have dependencies with other data flow paths 306. In this case, a data flow path 306 may use data 116 from other data flow paths 306 to perform an operation. For example, a first data flow path 306 may wait until a second data flow path 306 has been executed to obtain data 116 from the second data flow path 306 for its own operations.

Returning to the example in FIG. 3, the instructions 118 comprise three data flow paths 306 (shown as data flow paths 306A, 306B, and 306C). Each data flow path 306 comprises a subset of the commands 302 from the instructions 118 and identifies portions of the data 116 that corresponds with the subset of commands 302. For example, the first data flow path 306A comprises commands 302A, 302B, and 302C and identifies their corresponding data segments 304A, 304B, and 304C. The second data flow path 306B comprises commands 302D and 302E and identifies their corresponding data segments 304D and 304E. The third data flow path 306C comprises commands 302F and 302G and their corresponding data segments 304F and 304G.

Returning to FIG. 2 at step 208, the resource allocation device 102 selects a data flow path 306 from among the identified data flow paths 306. Here, the resource allocation device 102 iteratively selects data flow paths 306 for analysis and processing. In one embodiment, the resource allocation device 102 may select data flow paths 306 in a sequential order from the instructions 118. Selecting data flow paths 306 sequentially may help downstream data flow paths 306 by preventing delays caused by waiting for data results from upstream data flow paths 306. Referring to the example in FIG. 3, on the first iteration the resource allocation device 102 may select the first data flow path 306A.

Retuning to FIG. 2 at step 210, the resource allocation device 102 identifies data segments 304 from the data set 116 that corresponds with the selected data flow path 306. A data segment 304 is a portion of the data 116 that was originally received in step 204. Here, the resource allocation device 102 parses the data 116 to identify and extract data segments 304 that are associated with the commands 302 of the selected data flow path 306. Continuing with the previous example in FIG. 3, the resource allocation device 102 identifies the data segments 304A, 304B, and 304C which correspond with the first data flow path 306A.

Returning to FIG. 2 at step 212, the resource allocation device 102 generates an instruction segment 120 that comprises commands 302 for the selected data flow path 306 and the data segments 304 associated with the commands 302. By generating instruction segments 120, the resource allocation device 102 is able to partition the instructions 118 and the data 116 into smaller portions that can be individually assigned to a resource unit 106 for processing. Continuing with the previous example in FIG. 3, the resource allocation device 102 generates an instruction segment 120 that comprises commands 302A, 302B, and 302C and data segments 304A, 304B, and 304C.

Once the resource allocation device 102 generates an instruction segment 120, the resource allocation device 102 then assigns the instruction segment 120 to a resource unit 106 for processing. Returning to FIG. 2 at step 214, the resource allocation device 102 assigns the instruction segment 120 to a resource unit 106 from among a plurality of resource units 106. For example, the resource allocation device 102 may assign the instruction segment 120 to the first available resource unit 106. For instance, the resource allocation device 102 may determine which resource units 106 are currently available and may then assign the instruction segment 120 to one of the available resource units 106.

In one embodiment, the resource allocation device 102 may first determine processing requirements for the instruction segment 120 and may then assign the instruction segment 120 to a resource unit 106 that is able to satisfy the determined processing requirements. Examples of processing requirements include, but are not limited to, a minimum or maximum number of hardware resources, required hardware resources, required software resources, a throughput speed, an amount of available memory, a response time, a latency time, packet size limitations, bandwidth limitations, or any other suitable type of processing requirement. As an example, the resource allocation device 102 may determine that the processing requirements for the instruction segment 120 comprise a minimum amount of hardware resources (e.g. a number of processor or an amount of available memory). In this example, the resource allocation device 102 may select an appropriate resource unit 106 that can satisfy the processing requirements for the instruction segment 120.

In some embodiments, the resource allocation device 102 may use a combination of hardware resources from external devices (e.g. other network devices) and hardware resources from within the resource allocation device 102. For example, the resource allocation device 102 may assign the instruction segment 120 to one or more hardware resources (e.g. a processor and a memory) within the resource allocation device 102.

In some embodiments, the resource allocation device 102 may use previous allocation information to assign the instruction segment 120 to a resource unit 106. For example, the resource allocation device 102 may a comprise resource allocation history 412 that is stored in memory (e.g. memory 404). The resource allocation history 412 comprises information about which commands 302 have been previously assigned to different types of resource units 106. For example, the resource allocation history 412 may comprise information about associations between different commands 302 and different configurations of resource units 106. The resource allocation device 102 may use the information from the resource allocation history 412 to assign an instruction segment 120 to a resource unit 106. For example, the resource allocation device 102 may identify commands 302 within the instruction segment 120 and then may identify a resource unit 106 from the resource allocation history 412 that is associated with the same commands 302.

At step 216, the resource allocation device 102 generates control information 126 for the instruction segment 120. The control information 126 comprises reconstruction information for recombining processed data segments 122 from resource units 106 to generate a processed data set 124. For example, the control information 126 may indicate an order for arranging and/or combining the processed data segments 122 to generate the processed data set 124. The processed data set 124 is a similar result as if the data 116 and the instructions 118 had been processed completely by a single device. Referring to the example in FIG. 3, the control information 126 identifies data flow paths 306 within the instructions 118, an order for the data flow paths 306 within the instructions 118, an order for combining processed data segments 122 to generate a processed data set 124, and resource units 106 that are assigned to each instruction segment 120. In other examples, the control information 126 may identify mappings between data segments 304 and commands 302 or any other suitable type of information.

Returning to FIG. 2 at step 218, the resource allocation device 102 determines whether to select another data flow path 306 to assign to a resource unit 106. Here, the resource allocation device 102 determines whether all of the data flow paths 306 from within the instructions 118 have been allocated to a resource unit 106. The resource allocation devices 102 determines to select another data flow path 306 in response to determining that one or more of the identified data flow paths 306 within the instructions 118 have not been assigned to a resource unit 106. The resource allocation device 102 determines not to select another data flow path 306 when all of the identified data flow paths 306 have been assigned to a resource unit 106. The resource allocation device 102 returns to step 208 in response to determining to select another data flow path 306 to assign to a resource unit 106. Otherwise, the resource allocation device 102 proceeds to step 220 in response to determining not to select another data flow path 306 to assign to a resource unit 106.

After the instruction segments 120 have been allocated to resource units 106, the resource allocation device 102 continues to monitor the operation of the resource allocations 106 to determine whether to reallocate any of the instruction segments 120. For example, the resource allocation device 102 may monitor the number of interactions (e.g. function calls or data transfers) between two resource units 106. As an example, the resource allocation device 102 may count the number of times that the two resource units 106 communicate with each other to determine whether additional performance improvements can be achieved by consolidating the instruction segments 120 into a single resource unit 106. Consolidating the instruction segments 120 into a single resource unit 106 may provide reduce the amount of latency or delay that is caused by sending information between the different resource units 106 which allows the instruction segments 120 to be processed faster and provides a higher throughput. As an example, a first instruction segment 120 may be assigned to a first resource unit 106 and a second instruction segment 120 may be assigned to a second resource unit 106. The resource allocation device 102 may determine that the number of interactions between the first resource unit 106 and the second resource unit 106 exceeds a predetermined threshold value. In this case, the resource allocation device 102 may reallocate the second instruction segment 120 from the second resource unit 106 to the first resource unit 106. After reallocating the second instruction segment 120, the first resource unit 106 processes both the first instruction segment 120 and the second instruction segment 120.

After all of the instruction segments 120 have been assigned to a resource unit 106, the resource allocation device 102 waits to receive processed data segments 122 from the resource units 106. The processed data segment 122 is a result from a resource unit 106 after the resource unit 106 has processed the commands 302 and the data segments 304 associated with an instruction segment 120. For example, a resource unit 106 may receive an instruction segment 120 that corresponds with encrypting a portion of the data 116. In this example, the resource unit 106 may encrypt the portion of the data 116 using the commands 302 and data segments 304 provided in the instruction segment 120. The resource unit 106 then sends the encrypted portion of the data 116 back to the resource allocation device 102 as a processed data segment 122. As another example, a resource unit 106 may receive an instruction segment 120 that corresponds with manipulating a portion of the data 116. In this example, the resource unit 106 may perform one or more operations (e.g. mathematical operations or logical operations) on the portion of the data 116 using the commands 302 and the data segments 304 provided in the instruction segment 120. The resource unit 106 then sends the modified portion of the data 116 back to the resource allocation device 102 as a processed data segment 122. As another example, a resource unit 106 may receive an instruction segment 120 that corresponds with analyzing a portion of the data 116. In this example, the resource unit 106 may analyze a portion of the data 116 using the commands 302 and the data segments 304 provided in the instruction segment 120. The resource unit 106 then sends a result of the analysis back to the resource allocation device 102 as a processed data segment 122. In other examples, the resource allocation device 102 may receive processed data segments 122 from the resource units 106 after they each perform any other suitable type of operation on a portion of the data 116.

At step 220, the resource allocation device 102 receives processed data segments 122 from the plurality of resource units 106. Here, the resource allocation device 102 receives a processed data segment 122 from each of the resource units 106 that was assigned an instruction segment 120.

At step 222, the resource allocation device 102 combines the processed data segments 122 to generate a processed data set 124. Here, resource allocation device 102 combines the processed data segments 122 using the reconstruction instructions from the control information 126. For example, the control information 126 may provide details about how to combine the individual processed data segments 122 to generate a processed data set 124. For instance, the control information 126 may indicate an order for arranging the processed data segments 122 to generate the processed data set 124.

At step 224, the resource allocation device 102 outputs the processed data set 124. Here, the resource allocation device 102 sends the processed data set 124 back to the network device 104 that originally provided the data 116 and/or the instructions 118 for processing the data 116.

In one embodiment, the resource allocation device 102 may store information about the configuration of resource units 106 that were used to process the instruction segments 120 as resource allocation history 412 in memory (e.g. memory 404). For example, the resource allocation device 102 may store associations between commands 302 from each instruction segment 120 and the resource unit 106 where they were assigned. For instance, the resource allocation device 102 may determine a performance level for generating the processed data set 124 based on the operating conditions of the resource units 106 that were used to process the instruction segments 120. Examples of performance levels include, but are not limited to, a processor utilization rate, a memory utilization rate, a throughput rate, or any other suitable performance metric level. The resource allocation device 102 may compare the determined performance level to a predetermined threshold value that corresponds with a minimum performance level. In this example, the resource allocation device 102 may store associations between the commands from each instruction segment 120 and the resource unit 106 where they were assigned in response to determining that the determined performance level exceeds the predetermined threshold value. In other words, the resource allocation device 102 stores the association when the configuration of resource units 106 provides a sufficient level of performance. In other examples, the resource allocation device 102 may store any other type of information or associations between the instruction segments 120 and the resource units 106. The store information may be used at a later time by the resource allocation device 102 when determining how to allocate instruction segments 120 to resource units 106. For example, the resource allocation device 102 may use commands from within an instruction segment 120 to identify which type of resource unit to assign the instruction segment 120 to for processing.

Network Device Hardware Configuration

Figure 4:
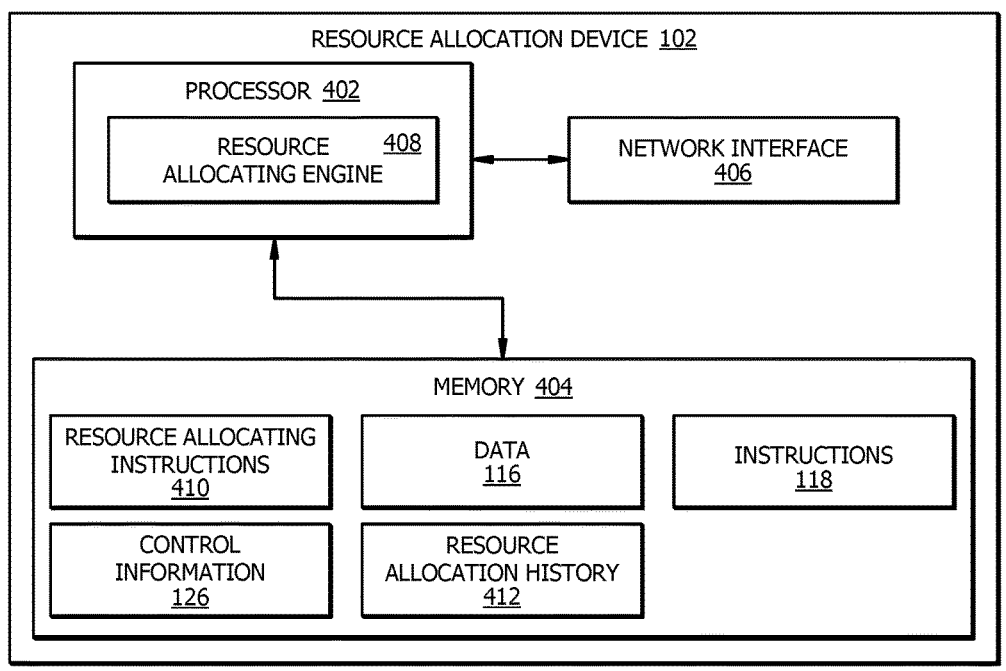
FIG. 4 is a schematic diagram of an embodiment of a device configured to allocate and manage hardware and software resources.

FIG. 4 is an embodiment of a device (e.g. resource allocation device 102) configured to allocate and manage hardware and software resources. The resource allocation device 102 comprises a processor 402, a memory 404, and a network interface 406. The resource allocation device 102 may be configured as shown or in any other suitable configuration.

The processor 402 comprises one or more processors operably coupled to the memory 404. The processor 402 is any electronic circuitry including, but not limited to, state machines, one or more central processing unit (CPU) chips, logic units, cores (e.g. a multi-core processor), field-programmable gate array (FPGAs), application specific integrated circuits (ASICs), or digital signal processors (DSPs). The processor 402 may be a programmable logic device, a microcontroller, a microprocessor, or any suitable combination of the preceding. The processor 402 is communicatively coupled to and in signal communication with the memory 404. The one or more processors are configured to process data and may be implemented in hardware or software. For example, the processor 402 may be 8-bit, 16-bit, 32-bit, 64-bit or of any other suitable architecture. The processor 402 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components.

The one or more processors are configured to implement various instructions. For example, the one or more processors are configured to execute instructions to implement a resource allocating engine 408. In this way, processor 402 may be a special purpose computer designed to implement the functions disclosed herein. In an embodiment, the resource allocating engine 408 is implemented using logic units, FPGAs, ASICs, DSPs, or any other suitable hardware. The resource allocating engine 408 is configured operate as described in FIGS. 1-3. For example, the resource allocating engine 408 may be configured to implement the preprocessor 110, the demultiplexer 112, and the multiplexer 114 as described in FIG. 1 and to perform the steps of method 200 as described in FIG. 2.

The memory 404 comprises one or more disks, tape drives, or solid-state drives, and may be used as an over-flow data storage device, to store programs when such programs are selected for execution, and to store instructions and data that are read during program execution. The memory 404 may be volatile or non-volatile and may comprise read-only memory (ROM), random-access memory (RAM), ternary content-addressable memory (TCAM), dynamic random-access memory (DRAM), and static random-access memory (SRAM).

The memory 404 is operable to store resource allocating instructions 410, data 116, instructions 118, control information 126, resource allocation history 412, and/or any other data or instructions. The resource allocating instructions 410 may comprise any suitable set of instructions, logic, rules, or code operable to execute the resource allocating engine 408. The data 116, instructions 118, control information 126, resource allocation history 412 are configured similar to the data 116, instructions 118, control information 126, resource allocation history 412 described in FIGS. 1-3, respectively.

The network interface 406 is configured to enable wired and/or wireless communications. The network interface 406 is configured to communicate data between the resource allocation device 102 and other devices (e.g. network devices 104 and resource units 106), systems, or domain. For example, the network interface 406 may comprise a WIFI interface, a LAN interface, a WAN interface, a modem, a switch, or a router. The processor 402 is configured to send and receive data using the network interface 406. The network interface 406 may be configured to use any suitable type of communication protocol as would be appreciated by one of ordinary skill in the art.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. A resource allocation device, comprising:
   a network interface in signal communication with a network device; and
   a processor operably coupled to the network interface, and configured to:
      receive a data set from the network device;
      receive instructions comprising a plurality of commands for processing the data set from the network device;
      identify a plurality of data flow paths within the instructions, wherein:
         each data flow path comprises a subset of commands from the plurality of commands in the instructions for processing the data set; and
         each data flow path is associated with a portion of the data set that is processed using a corresponding subset of commands;
      parse the data set into a plurality of data segments, wherein each data segment corresponds with a portion of the data set that is processed by a data flow path;
      generate an instruction segment for each data flow path by associating each data segment from the plurality of data segments with a corresponding subset of commands for each data flow path;
      assign each instruction segment to a resource unit from among a plurality of resource units, wherein each resource unit comprises a combination of hardware resources and software resources for processing data;
      generate control information that comprises reconstruction instructions for combining processed data segments from the plurality of resource units, wherein the control information identifies an order for arranging processed data segments to generate a processed data set;
      receive processed data segments from the plurality of resource units;

generate the processed data set by combining the received processed data segments in accordance with the reconstruction instructions in the control information; and output the processed data set to the network device.

2. The device of claim 1, wherein the processor is further configured to:
    determine a performance level for generating the processed data set based on operating conditions of resource units used to generate the processed data set;
    compare the performance level to a predetermined threshold value, wherein the predetermined threshold value is a minimum performance level;
    determine the performance level for the processed data set exceeds the predetermined threshold value; and
    store associations between commands from each instruction segment and corresponding resource units that are assigned to each instruction segment in response to determining that the performance level for the processed data set exceeds the predetermined threshold value.

3. The device of claim 1, wherein:
    the resource allocation device further comprises a memory operable to store resource allocation history, wherein the resource allocation history identifies:
        a plurality of commands; and
        previous mappings between resource units and the plurality of commands; and
    assigning instruction segments to a resource unit comprises:
        identifying commands within an instruction segment; and
        identifying a resource unit from the resource allocation history that is mapped to the identified commands in the instruction segment.

4. The device of claim 1, wherein the control information further identifies mappings between data segments and subsets of commands for each data flow path.

5. The device of claim 1, wherein the processor is further configured to:
    determine a number of interactions between a first resource unit from among the plurality of resource units that is processing a first instruction segment and a second resource unit from among the plurality of resource units that is processing a second instruction segment;
    compare the number of interactions to a predetermined threshold value, wherein the predetermined threshold value indicates a maximum number of interactions between instruction segments;
    determine the number of interactions exceeds the predetermined threshold value; and
    reassign the second instruction segment to the first resource unit in response to determining that the number of interactions exceeds the predetermined threshold value.

6. The device of claim 1, wherein:
    the resource allocation device further comprises a first plurality of hardware resources for processing data;
    the network interface is in signal communication with a second network device comprising a second plurality of hardware resources for processing data; and
    assigning instruction segments to a resource unit comprises:
        assigning at least one instruction segment to a hardware resource from among the first plurality of hardware resources within the resource allocation device; and
        assigning at least one instruction segment to a hardware resource from among the second plurality of hardware resources within the second network device.

7. The device of claim 1, wherein assigning instruction segments to a resource unit comprises:
    determining processing requirements for an instruction segment, wherein the processing requirements identify a minimum amount of hardware resources for executing commands for the instruction segment; and
    selecting a resource unit that comprises at least the minimum amount of hardware resources for executing commands for the instruction segment.

8. A resource allocation method, comprising:
    receiving a data set from a network device;
    receiving instructions comprising a plurality of commands for processing the data set from the network device;
    identifying a plurality of data flow paths within the instructions, wherein:
        each data flow path comprises a subset of commands from the plurality of commands in the instructions for processing the data set; and
        each data flow path is associated with a portion of the data set that is processed using a corresponding subset of commands;
    parsing the data set into a plurality of data segments, wherein each data segment corresponds with a portion of the data set that is processed by a data flow path;
    generating an instruction segment for each data flow path by associating each data segment from the plurality of data segments with a corresponding subset of commands for each data flow path;
    assigning each instruction segment to a resource unit from among a plurality of resource units, wherein each resource unit comprises a combination of hardware resources and software resources for processing data;
    generating control information that comprises reconstruction instructions for combining processed data segments from the plurality of resource units, wherein the control information identifies an order for arranging processed data segments to generate a processed data set;
    receiving processed data segments from the plurality of resource units;
    generating the processed data set by combining the received processed data segments in accordance with the reconstruction instructions in the control information; and
    outputting the processed data set to the network device.

9. The method of claim 8, further comprising:
    determining a performance level for generating the processed data set based on operating conditions of resource units used to generate the processed data set;
    comparing the performance level to a predetermined threshold value, wherein the predetermined threshold value is a minimum performance level;
    determining the performance level for the processed data set exceeds the predetermined threshold value; and
    storing associations between commands from each instruction segment and corresponding resource units that are assigned to each instruction segment in response to determining that the performance level for the processed data set exceeds the predetermined threshold value.

10. The method of claim 8, wherein assigning instruction segments to a resource unit comprises:
    identifying commands within an instruction segment; and identifying a resource unit from a resource allocation history that is mapped to the identified commands in the instruction segment, wherein the resource allocation history identifies:
a plurality of commands; and
previous mappings between resource units and the plurality of commands.

11. The method of claim 8, wherein the control information further identifies mappings between data segments and subsets of commands for each data flow path.

12. The method of claim 8, further comprising:
determining a number of interactions between a first resource unit from among the plurality of resource units that is processing a first instruction segment and a second resource unit from among the plurality of resource units that is processing a second instruction segment;
comparing the number of interactions to a predetermined threshold value, wherein the predetermined threshold value indicates a maximum number of interactions between instruction segments;
determining the number of interactions exceeds the predetermined threshold value; and
reassigning the second instruction segment to the first resource unit in response to determining that the number of interactions exceeds the predetermined threshold value.

13. The method of claim 8, wherein assigning instruction segments to a resource unit comprises:
determining processing requirements for an instruction segment, wherein the processing requirements identify a minimum amount of hardware resources for executing commands for the instruction segment; and
selecting a resource unit that comprises at least the minimum amount of hardware resources for executing commands for the instruction segment.

14. The method of claim 8, wherein the control information identifies a mapping between an instruction segment and a resource unit where the instruction segment has been assigned to.

15. A computer program comprising executable instructions stored in a non-transitory computer readable medium that when executed by a processor causes the processor to:
receive a data set from a network device;
receive instructions comprising a plurality of commands for processing the data set from the network device;
identify a plurality of data flow paths within the instructions, wherein:
each data flow path comprises a subset of commands from the plurality of commands in the instructions for processing the data set; and
each data flow path is associated with a portion of the data set that is processed using a corresponding subset of commands;
parse the data set into a plurality of data segments, wherein each data segment corresponds with a portion of the data set that is processed by a data flow path;
generate an instruction segment for each data flow path by associating each data segment from the plurality of data segments with a corresponding subset of commands for each data flow path;
assign each instruction segment to a resource unit from among a plurality of resource units, wherein each resource unit comprises a combination of hardware resources and software resources for processing data;
generate control information that comprises reconstruction instructions for combining processed data segments from the plurality of resource units, wherein the control information identifies an order for arranging processed data segments to generate a processed data set;
receive processed data segments from the plurality of resource units;
generate the processed data set by combining the received processed data segments in accordance with the reconstruction instructions in the control information; and
output the processed data set to the network device.

16. The computer program of claim 15, further comprising instructions that when executed by the processor causes the processor to:
determine a performance level for generating the processed data set based on operating conditions of resource units used to generate the processed data set;
compare the performance level to a predetermined threshold value, wherein the predetermined threshold value is a minimum performance level;
determine the performance level for the processed data set exceeds the predetermined threshold value; and
store associations between commands from each instruction segment and corresponding resource units that are assigned to each instruction segment in response to determining that the performance level for the processed data set exceeds the predetermined threshold value.

17. The computer program of claim 15, wherein assigning instruction segments to a resource unit comprises:
identifying commands within an instruction segment; and
identifying a resource unit from a resource allocation history that is mapped to the identified commands in the instruction segment, wherein the resource allocation history identifies:
a plurality of commands; and
previous mappings between resource units and the plurality of commands.

18. The computer program of claim 15, wherein the control information further identifies associations between data segments and subsets of commands for each data flow path.

19. The computer program of claim 15, further comprising instructions that when executed by the processor causes the processor to:
determine a number of interactions between a first resource unit from among the plurality of resource units that is processing a first instruction segment and a second resource unit from among the plurality of resource units that is processing a second instruction segment;
compare the number of interactions to a predetermined threshold value, wherein the predetermined threshold value indicates a maximum number of interactions between instruction segments;
determine the number of interactions exceeds the predetermined threshold value; and
reassign the second instruction segment to the first resource unit in response to determining that the number of interactions exceeds the predetermined threshold value.

20. The computer program of claim 15, wherein assigning instruction segments to a resource unit comprises:
determining processing requirements for an instruction segment, wherein the processing requirements identify a minimum amount of hardware resources for executing commands for the instruction segment; and selecting a resource unit that comprises at least the minimum amount of hardware resources for executing commands for the instruction segment.

\* \* \* \* \*